Oct. 4, 1966

T. F. CARMICHAEL 3,277,360

CONSTANT VOLTAGE A.C.-D.C. CONVERSION SYSTEM

Filed June 18, 1962

INVENTOR.
Thomas F. Carmichael
BY
Harness, Dickey & Pierce
ATTORNEYS 3,277,360
CONSTANT VOLTAGE A.C.-D.C.
CONVERSION SYSTEM
Thomas F. Carmichael, Drayton Plains, Mich., assignor to Syncro Corporation, Oxford, Mich., a corporation of Michigan
Filed June 18, 1962, Ser. No. 203,045
12 Claims. (Cl. 321—16)

This invention relates generally to voltage regulators and more particularly to an electronic device for providing a substantially constant output potential.

There are many instances in which a substantially constant potential is required regardless of line fluctuations and/or changes in load; therefore, it is an object of this invention to provide a novel voltage regulator circuit for providing an output potential of substantially constant magnitude regardless of fluctuations of potential at the source and/or changes in the magnitude of the load.

It is another object of this invention to provide a novel voltage regulator circuit operable from a source of alternating current to provide a direct current output having a substantially constant average magnitude regardless of fluctuations of potential at the source and/or changes in the magnitude of the load.

Figure 1:
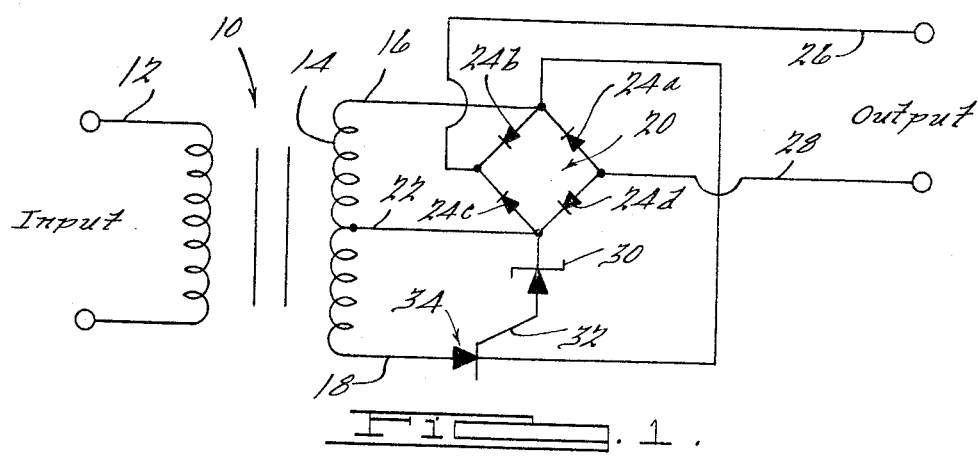
Figure 2:
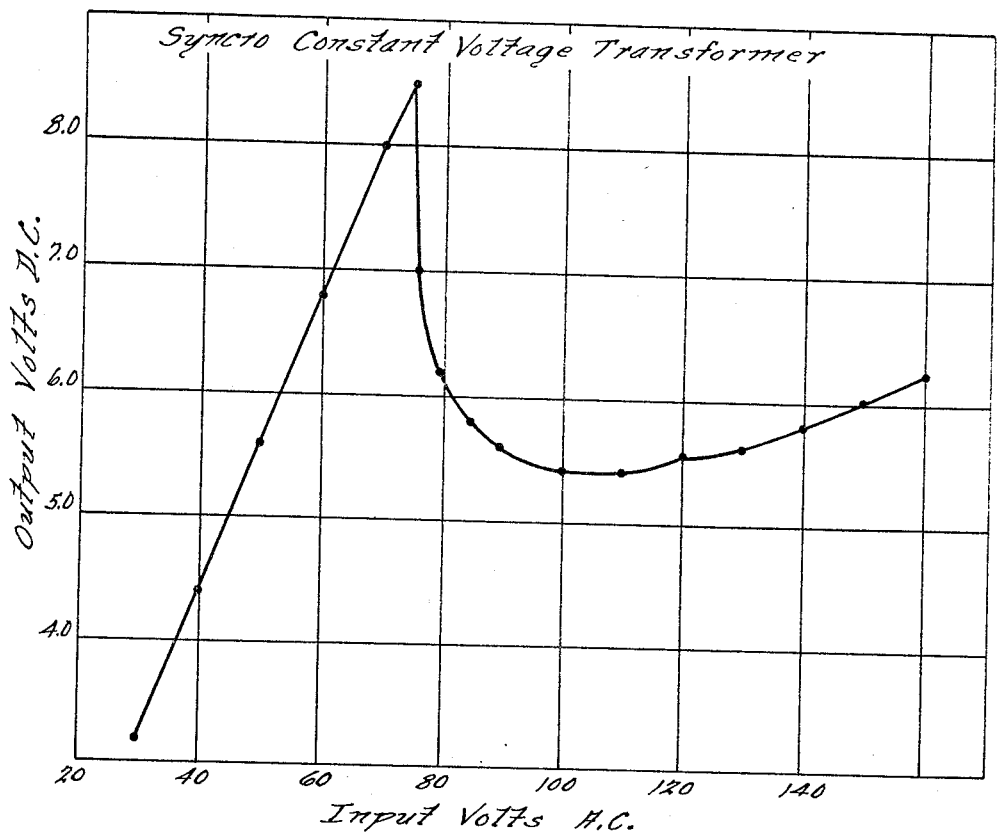

Other objects, features, and advantages of the present invention will become apparent from the subsequent description and the appended claims, taken in conjunction with the accompanying drawings, in which:

FIGURE 1 is a schematic diagram of an electrical circuit embodying the features of this invention; and FIGURE 2 is a graph exemplifying the operation of a device constructed according to the circuit of FIGURE 1 and showing the relationship between an alternating input potential applied to the device and a direct output potential obtained from the device.

In general, the voltage regulator of this invention automatically regulates the magnitude of the potential applied to a load circuit. The regulator is operable from a source of alternating potential and has an input circuit coupled to the source and an output circuit connected to the load circuit for applying thereto a potential of the desired magnitude. A control circuit is connected to the input of the regulator and is actuable to provide a short circuit thereacross for a portion of half cycles of the input potential. These short circuit portions are automatically varied in duration to provide a resultant output potential of substantially constant magnitude.

Looking more specifically now to FIGURE 1, a transformer 10 has a primary winding 12 connected to a suitable source of alternating current potential (not shown) and has a secondary winding 14 with a pair of output terminals 16 and 18 connected thereto. A full wave rectifier 20 has an input circuit with one side connected directly to the output conductor 16 of secondary winding 14 and with the other side connected to a preselected point along the secondary transformer 14 via a conductor 22. The full wave rectifier bridge 20 is of a conventional construction and is comprised of four diodes 24a–24d connected in the manner shown in FIGURE 1 for full wave rectification of the alternating potential input. Thus the input circuit of the full wave rectifier bridge 20 has one side at the juncture of diodes 24a and 24b and the other side at the juncture of diodes 24c and 24d. The rectifier bridge 20 has an output circuit which has one side at the juncture of diodes 24b and 24c and the other side at the juncture of diodes 24a and 24d; a pair of output conductors 26 and 28 are connected to the one and other side, respectively, of the output circuit. Thus, if an alternating potential is applied to the primary 12 of transformer 10, this potential is stepped down via the potrion of the secondary winding 14 between the conductor 16 and the tap 22 and applied to the input circuit of the full wave rectifier 20; the rectifier 20 provides at its output circuit a pulsating, direct potential having an average magnitude depending upon the magnitude of the alternating potential applied to the input. The conductors 26 and 28 can be connected to a suitable load (not shown).

In order to regulate the magnitude of the direct potential at the output circuit of the full wave rectifier bridge 20, a zener diode 30 has its cathode connected to the tap 22, and hence to the juncture of diodes 24c and 24d of the full wave rectifier bridge 20, and has its anode connected to a gate electrode 32 of a controlled rectifier 34. The controlled rectifier 34 is connected directly across the secondary winding 14 and has its anode connected to conductor 18 and its cathode connected directly to the conductor 16.

The zener diode 30 operates in the conventional manner and imposes a substantially open circuit until the critical breakdown voltage is reached; at that point the zener diode 30 breaks down and then becomes a low resistance short or closed circuit. The controlled rectifier 34 operates in a manner similar to a thyratron. When the gate electrode is rendered positive relative to the cathode such as to allow current to flow therebetween, upon application of a positive potential to the anode relative to the cathode, current will then flow from anode to cathode. Once current flow from anode to cathode has been initiated the gate electrode 32 can no longer control the conduction of the controlled rectifier 34 and hence the controlled rectifier 34 will continue to conduct until the positive potential between anode and cathode has been substantially removed. Once conduction has terminated, the controlled rectifier will not conduct from anode to cathode again until both the requisite current flow in the gate to cathode circuit occurs and a positive potential is applied to the anode relative to the cathode.

In operation, then, an alternating potential is applied to the primary 12 of the transformer 10 and an alternating potential is induced into the secondary winding 14 and across that portion of the secondary winding 14 between the conductors 16 and 22 and hence across the input circuit of the full wave rectifier bridge 20. The bridge 20 rectifies the alternating potential and provides a pulsating direct potential in the output circuit and across the conductors 26 and 28. On alternate half cycles when the conductor 16 is at a negative potential relative to conductor 18, the tap conductor 22 is more positive than conductor 16 thus providing a positive potential from cathode to anode on the Zener diode 30, via the circuitry of the cathode and gate electrodes of controlled rectifier 34. As the alternating potential on these alternate half cycles reaches a preselected value, the Zener diode will break down allowing conduction through the gate electrode 32 and through the cathode of controlled rectifier 34. At this time the conductor 18 is positive relative to the conductor 16 and a positive potential is applied from anode to cathode of the controlled rectifier 34 thus causing the controlled rectifier 34 to conduct. With the controlled rectifier 34 in the conductive state it provides a low resistance path for the entire secondary winding 14 including that portion of the secondary winding 14 between the conductor 16 and tap 22. Thus, when the controlled rectifier 34 is in a conductive state, essentially a short circuit path is provided across the secondary winding 14 thereby substantially shunting the current to the input circuit of the full wave rectifier 20 and hence substantially reducing the direct output potential to zero. As the potential of the conductor 18 begins to go negative on the next half cycle of the alternating potential, the controlled rectifier 34 is turned off and a direct potential again appears at the output circuit across conductors 26, 28. The average magnitude of the direct output potential will depend upon the point in the alternating half cycles at which the zener 30 conducts and hence at which the controlled rectifier 34 is rendered conductive. If the alternating potential increases in magnitude the zener 30 (and controlled rectifier 34) will fire sooner in the cycle, resulting in a short circuit of the rectifier 20 for a greater portion of the alternate half cycles. If the alternating potential drops in magnitude, the converse occurs. Thus, by selecting the point along the wave of the alternate half cycles at which conduction is substantially interrupted to the full wave rectifier 20, the average magnitude of the direct potential in the output can be maintained at a desired value. The point of conduction of the controlled rectifier 34 can be changed by providing a zener diode having different firing characteristics or by providing some other suitable means for providing the required current flow from gate 32 to cathode. The point of conduction of controlled rectifier 34 can also be varied by providing more turns between the tap conductor 22 and the conductor 18, or by providing more turns between the conductor 16 and tap 22.

In the preferred embodiment the transformer 10 is of a high reactance type providing a high impedance under short circuit conditions to thereby prevent damage to the transformer 10 and the associated circuitry.

An example of some of the results available in a device constructed in accordance with the circuitry as shown in FIGURE 1 can be seen in the graph of FIGURE 2, which depicts the relationship of direct output voltage versus alternating input voltage. The curve of FIGURE 2 indicates that with an alternating potential input varying between 90 and 130 volts, the direct output potential varies only slightly, i.e., less than ±.1 volt, from an average potential of approximately 5 volts. The circuitry of FIGURE 1 not only allows for automatic regulation of fluctuations in line potential but also provides for automatic regulation of potential changes due to change in load. Thus, as a greater load is applied to the output, the potential between the conductor 16 and the tap 22 will drop. Without regulation this would result in a drop in the magnitude of the direct voltage output. With the circuitry as described, however, the drop in potential between conductor 16 and tap 22 causes the zener diode 30 to fire later in the half cycle resulting in conduction of controlled rectifier 34 over a decreased portion of each of the alternating half cycles, thus resulting in the maintenance of a substantially constant direct output potential. If the load decreases, the converse occurs to maintain the direct output potential substantially constant.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:
1. A voltage regulator circuit for automatically regulating the magnitude of the potential applied to an output load circuit comprising input circuit means for providing an alternating input potential from a source, rectifier means having a rectifier input circuit connected to said input circuit means and having an output circuit connected to the output load circuit for providing a rectified potential to the output load circuit, control circuit means connected to said rectifier input circuit of said rectifier means for substantially short circuiting across said rectifier input circuit during a preselected portion of alternate half cycles of the alternating input potential from said rectifier input circuit means responsively to a trigger signal, trigger circuit means connected to said input circuit means for providing said trigger signal responsively to a potential of a preselected magnitude across said input circuit means.

2. A voltage regulator circuit for automatically providing an output potential having a substantially constant magnitude comprising a transformer having a primary winding connected to a source of alternating potential and a secondary winding, rectifier means having an input circuit and an output circuit for providing a direct potential in said output circuit responsively to an alternating potential applied to said input circuit, circuit means electrically connecting said input circuit of said rectifier means across a portion of said secondary winding, control circuit means for substantially short circuiting across said input circuit during preselected portions of alternate half cycles of the alternating potential applied to said input circuit responsively to a potential of a preselected magnitude across said portion of said secondary winding, said control circuit means comprising switch means providing a low impedance path for said portion of said secondary winding during said preselected portions of said alternate half cycles responsively to a trigger signal, said control circuit means further comprising means for providing said trigger signal to said switch means responsively to said potential of said preselected magnitude across said portion of said secondary winding.

3. A voltage regulator circuit for automatically providing an output potential having a substantially constant magnitude comprising a high reactance transformer having a primary winding connected to a source of alternating potential and a secondary winding, rectifier means having an input circuit and an output circuit for providing a direct potential in said output circuit responsively to an alternating potential applied to said input circuit, circuit means electrically connecting said input circuit of said rectifier means across a portion of said secondary winding, control circuit means for substantially short circuiting across said input circuit during preselected portions of alternate half cycles of the alternating potential applied to said input circuit responsively to a potential of a preselected magnitude across said portion of said secondary winding, said control circuit means comprising switch means providing a low impedance path for said portion of said secondary winding during said preselected portions of said alternate half cycles responsively to a trigger signal, said control circuit means further comprising means for providing said trigger signal to said switch means responsively to said potential of said preselected magnitude across said portion of said secondary winding.

4. A voltage regulator circuit for automatically providing an output potential having a substantially constant magnitude comprising a transformer having a primary winding connected to a source of alternating potential and a secondary winding, rectifier means having an input circuit and an output circuit for providing a direct potential in said output circuit responsively to an alternating current potential applied to said input circuit, circuit means electrically connecting said input circuit of said rectifier means across a portion of said secondary winding, control circuit means for substantially short circuiting across said input circuit during preselected portions of alternate half cycles of the alternating potential applied to said input circuit responsively to a potential of a preselected magnitude across said portion of said secondary winding, said control circuit means comprising switch means electrically connected across said secondary winding for providing a low impedance path thereacross during said preselected portions of said alternate half cycles responsively to a trigger signal, said control circuit means further comprising means electrically connected across said first portion of said secondary windings for providing said trigger signal to said switch means responsively to said potential of said preselected magnitude across said portion of said secondary winding.

5. A voltage regulator circuit for automatically providing an output potential having a substantially constant magnitude comprising a transformer having a primary winding connected to a source of alternating potential and a secondary winding, rectifier means having an input circuit and an output circuit for providing a direct potential in said output circuit responsively to an alternating current potential applied to said input circuit, circuit means electrically connecting said input circuit of said rectifier means across a portion of said secondary winding, control circuit means for substantially short circuiting across said input circuit during preselected portions of alternate half cycles of the alternating potential applied to said input circuit responsively to a trigger potential of a preselected magnitude across said portion of said secondary winding, said control circuit means comprising asymmetric switch means electrically connected across said secondary winding and being capable of conduction only during said alternate half cycles for providing a low impedance path thereacross during said preselected portions of said alternate half cycles responsively to a trigger signal, said control circuit means further comprising means electrically connected across said first portion of said secondary windings for providing said trigger signal to said switch means responsively to said trigger potential.

6. A voltage regulator circuit for automatically providing an output potential having a substantially constant magnitude comprising a transformer having a primary winding connected to a source of alternating potential and a secondary winding, rectifier means having an input circuit and an output circuit for providing a direct potential in said output circuit responsively to an alternating potential applied to said input circuit, circuit means electrically connecting said input circuit of said rectifier means across a portion of said secondary winding, control circuit means substantially short circuiting across said input circuit during preselected portions of alternate half cycles of the alternating potential applied to said input circuit responsively to a potential of a preselected magnitude across said portion of said secondary winding, said control circuit means comprising a controlled rectifier having a pair of principal electrodes and a gate electrode, circuit means electrically connecting said principal electrodes of said controlled rectifier across said secondary winding, and circuit means including one of said principal electrodes electrically connecting said gate electrode across said portion of said secondary.

7. A voltage regulator circuit for automatically providing an output potential having a substantially constant magnitude comprising a transformer having a primary winding connected to a source of alternating potential and a secondary winding, rectifier means having an input circuit and an output circuit for providing a direct current potential in said output circuit responsively to an alternating current potential applied to said input circuit, circuit means electrically connecting said input circuit of said rectifier means across a portion of said secondary winding, control circuit means substantially short circuiting across said input circuit during preselected portions of alternate half cycles of the alternating potential applied to said input circuit responsively to a potential of a preselected magnitude across said portion of said secondary winding, said control circuit means comprising a controlled rectifier having a pair of principal electrodes and a gate electrode with said principal electrodes being rendered conductive responsively to a trigger signal applied to said gate electrode and to one of said principal electrodes, circuit means electrically connecting said principal electrodes of said controlled rectifier across said secondary winding, and circuit means including said one of said principal electrodes electrically connecting said gate electrode across said portion of said secondary, said last-named circuit means including trigger means for providing said trigger signal responsively to said potential of said preselected magnitude across said portion of said secondary winding.

8. The regulator of claim 7 with said trigger means being a zener diode.

9. A voltage regulator circuit for automatically maintaining the output potential at a substantially constant magnitude comprising a transformer having a primary winding connected to a source of alternating current potential and having a secondary winding, a full wave rectifier bridge having an input circuit and an output circuit for providing a direct potential in said output circuit responsively to an alternating potential applied to said input circuit, circuit means electrically connecting said input circuit of said rectifier means to one end of said secondary winding and to a tap connected along said secondary winding, a controlled rectifier having an anode, cathode and gate electrodes, circuit means connecting said anode to the other end of said secondary winding and connecting said cathode to said one end of said secondary winding, and a zener diode having a cathode and an anode electrode with said cathode of said zener diode connected to said tap and with said anode of said zener diode connected to said gate electrode of said controlled rectifier.

10. A voltage regulator circuit for automatically maintaining the output potential at a substantially constant magnitude comprising a high reactance transformer having a primary winding connected to a source of alternating current potential and having a secondary winding, a full wave rectifier bridge having an input circuit and an output circuit for providing a direct potential in said output circuit responsively to an alternating potential applied to said input circuit, circuit means electrically connecting said input circuit of said rectifier means to one end of said secondary winding and to a tap connected along said secondary winding, a controlled rectifier having an anode, cathode and gate electrodes, circuit means connecting said anode to the other end of said secondary winding and connecting said cathode to said one end of said secondary winding, and a zener diode having a cathode and an anode electrode with said cathode of said zener diode connected to said tap and with said anode of said zener diode connected to said gate electrode of said controlled rectifier.

11. A voltage regulator circuit for automatically regulating the magnitude of the potential applied to an output load circuit comprising input circuit means for providing an alternating potential from a source, rectifier means having a rectifier input circuit connected to said input circuit means and having an output circuit connected to the output load circuit for providing a rectified potential to the output load circuit, control circuit means connected to said rectifier means for completing a low impedance path across one of said circuits of said rectifier means during a preselected portion of selected half cycles of the alternating input potential from said input circuit means responsively to a trigger signal, trigger circuit means connected to a first one of said circuits of said rectifier means and responsive to a potential of a preselected magnitude across said first one of said circuits of said rectifier means for providing said trigger signal.

12. A voltage regulator circuit for automatically providing an output potential having a substantially constant magnitude comprising a transformer having a primary winding connected to a source of alternating potential and a secondary winding, rectifier means having an input circuit and an output circuit for providing a direct potential in said output circuit responsively to an alternating potential applied to said input circuit, circuit means electrically connecting said input circuit of said rectifier means to said secondary winding, control circuit means for providing a low impedance path across one of said circuits of said rectifier means during preselected portions of selected half cycles of the alternating potential responsively to a potential of a preselected magnitude across a first one of said circuits of said rectifier means, said control circuit means comprising switch means for providing said low impedance path during said preselected portions of said selected half cycles responsively to a trigger signal, said control circuit means further comprising means for providing said trigger signal to said switch means responsively to said potential of said preselected magnitude across said first one of said circuits of said rectifier means.

References Cited by the Examiner

UNITED STATES PATENTS

| | | | |
|---|---|---|---|
| 1,992,146 | 2/1935 | Craig | 323—45 |
| 2,584,748 | 2/1952 | Smith | 323—45 |
| 2,862,170 | 11/1958 | Hjermstad | 321—6 |
| 3,141,124 | 7/1964 | Atherton | 320—1 |
| 3,146,392 | 8/1964 | Sylvan | 323—22 |
| 3,204,172 | 8/1965 | Darling et al. | 321—8 |
| 3,204,174 | 8/1965 | Clerc | 323—22 |
| 3,213,349 | 10/1965 | Gutzwiller | 321—11 |

FOREIGN PATENTS 436,764  10/1935  Great Britain.

OTHER REFERENCES

G.E. Controlled Rectifier Manual, 1st ed. (March 21, 1960), pages 85 and 86 relied on.

JOHN F. COUCH, *Primary Examiner.*

LLOYD McCOLLUM, *Examiner.*

G. H. GERSTMAN, W. E. RAY, *Assistant Examiners.*